(12) United States Patent
Kanada

(10) Patent No.: US 12,386,341 B2
(45) Date of Patent: Aug. 12, 2025

(54) INFORMATION PROCESSING METHOD, INFORMATION PROCESSING APPARATUS, CONTROL PROGRAM, STORAGE MEDIUM, METHOD OF MANUFACTURING PRODUCT, AND METHOD OF ACQUIRING LEARNING DATA

(71) Applicant: CANON KABUSHIKI KAISHA, Tokyo (JP)

(72) Inventor: Satoru Kanada, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 634 days.

(21) Appl. No.: 17/733,506

(22) Filed: Apr. 29, 2022

(65) Prior Publication Data
US 2022/0357726 A1 Nov. 10, 2022

(30) Foreign Application Priority Data
May 6, 2021 (JP) .................... 2021-078632

(51) Int. Cl.
*G05B 19/418* (2006.01)
*G05B 23/02* (2006.01)
(Continued)

(52) U.S. Cl.
CPC ... *G05B 19/41875* (2013.01); *G05B 23/0272* (2013.01); *G05B 23/0283* (2013.01);
(Continued)

(58) Field of Classification Search
CPC .......... G05B 19/41875; G05B 23/0272; G05B 23/0283; G06F 3/048; G06F 3/04817; G06F 3/0485
See application file for complete search history.

(56) References Cited

U.S. PATENT DOCUMENTS 9,501,851 B2 * 11/2016 Cervelli ............. G06F 3/04847
9,767,172 B2 * 9/2017 Fackler ................ G06F 16/252
(Continued)

FOREIGN PATENT DOCUMENTS

CN  101354317 A  1/2009
CN  103457247 A  12/2013
(Continued)

*Primary Examiner* — Tadesse Hailu
(74) *Attorney, Agent, or Firm* — Canon U.S.A., Inc. IP Division

(57) ABSTRACT

An information processing method includes causing an information processing apparatus to display a first image on which a plurality of pieces of partial time-series data of a physical quantity regarding a state of a mechanical apparatus are displayed, causing the information processing apparatus to display a second image on which the plurality of pieces of partial time-series data are displayed at intervals different from intervals at which the plurality of pieces of partial time-series data are displayed on the first image, and causing the information processing apparatus to display a first mark marking first partial time-series data that is predetermined one of the plurality of pieces of partial time-series data displayed on the first image and a second mark marking second partial time-series data that is one of the plurality of pieces of partial time-series data displayed on the second image and that corresponds to the first partial time-series data.

29 Claims, 16 Drawing Sheets

(51) Int. Cl.
   *G06F 3/048*       (2013.01)
   *G06F 3/04817*     (2022.01)
   *G06F 3/0485*      (2022.01)

(52) U.S. Cl.
   CPC .......... *G06F 3/048* (2013.01); *G06F 3/04817* (2013.01); *G06F 3/0485* (2013.01)

(56) References Cited

U.S. PATENT DOCUMENTS

| | | | |
|---|---|---|---|
| 10,539,931 B2 * | 1/2020 | Luo | G05B 23/0264 |
| 11,531,680 B2 * | 12/2022 | Fackler | G06F 3/04842 |
| 11,774,295 B2 * | 10/2023 | Brady | G01K 7/01 |
| | | | 327/512 |
| 2015/0160098 A1 * | 6/2015 | Noda | G01M 99/00 |
| | | | 702/35 |
| 2016/0357828 A1 * | 12/2016 | Tobin | G06F 16/248 |
| 2018/0231969 A1 * | 8/2018 | Noda | G05B 23/0283 |
| 2022/0413480 A1 * | 12/2022 | Iizawa | G05B 23/0254 |

FOREIGN PATENT DOCUMENTS

| | | |
|---|---|---|
| CN | 112345827 A | 2/2021 |
| CN | 112639431 A | 4/2021 |
| DE | 3112706 A1 | 10/1982 |
| DE | 102013100411 A1 | 5/2014 |
| JP | 2002-259348 A | 9/2002 |
| JP | 2009075029 A | 4/2009 |
| JP | 2013-232061 A | 11/2013 |
| JP | 2015-056028 A | 3/2015 |
| JP | 2019-123052 A | 7/2019 |
| WO | 2020115827 A1 | 6/2020 |

\* cited by examiner

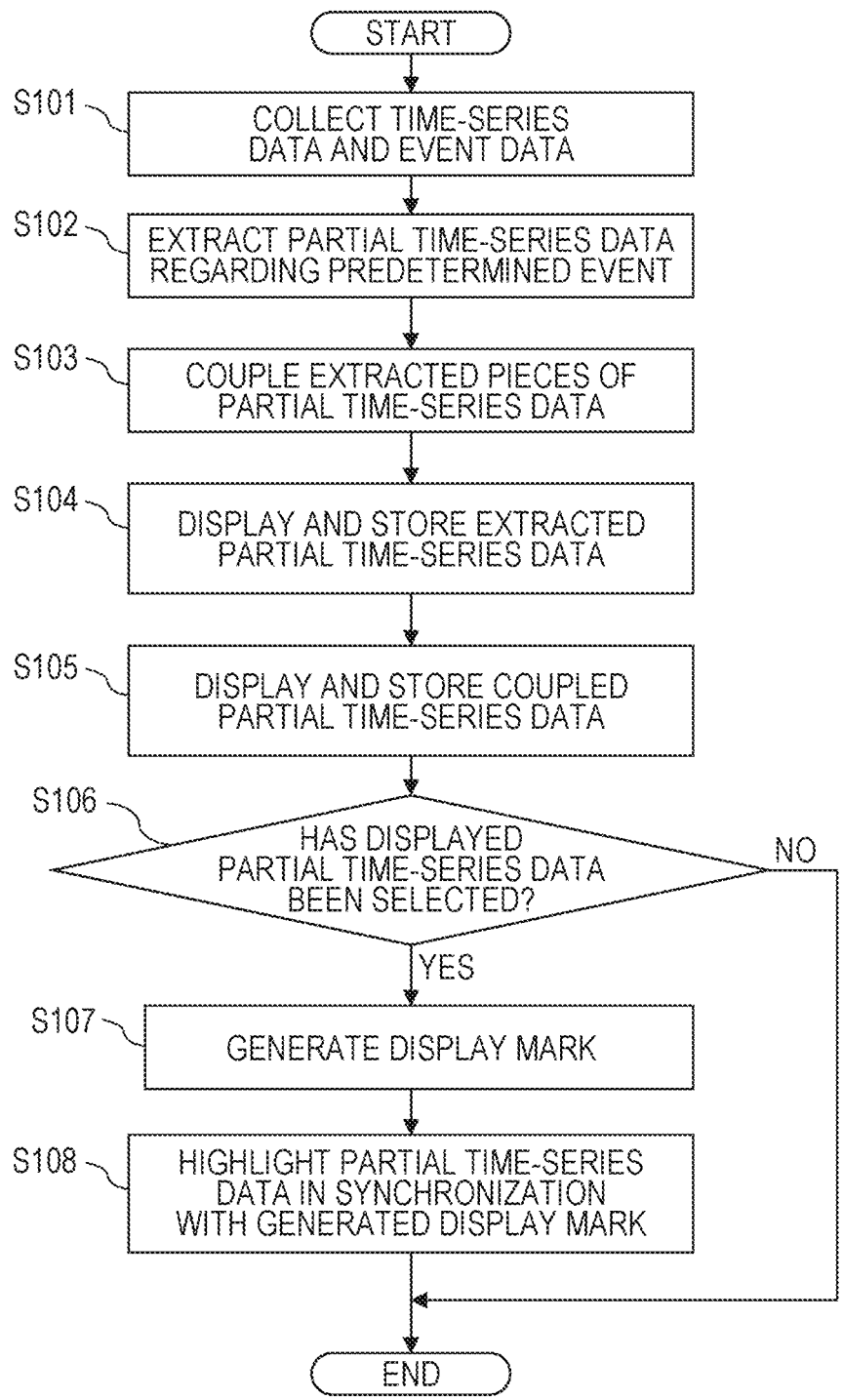

FIG. 4A

| MEASUREMENT VALUE | CURRENT VALUE (A) |
|---|---|
| 4/9/2017 | 13 |
| 4/9/2017 | 13 |
| 4/9/2017 | 13 |
| 4/9/2017 | 19 |
| 4/9/2017 | 19 |
| 4/9/2017 | 23 |
| 4/9/2017 | 28 |
| 4/9/2017 | 29 |
| ⋮ | ⋮ |
| 4/8/2018 | 4 |
| 4/8/2018 | 4 |
| 4/8/2018 | 9 |
| 4/8/2018 | 11 |
| 4/8/2018 | 13 |
| 4/8/2018 | 13 |
| 4/8/2018 | 13 |

FIG. 4B

| SHUTDOWN DATE OF ROBOT |
|---|
| 4/9/2017 |
| 4/16/2017 |
| 4/18/2017 |
| 4/20/2017 |
| 4/26/2017 |
| 5/4/2017 |
| 5/5/2017 |
| 5/8/2017 |
| 6/5/2017 |
| 6/22/2017 |
| 6/29/2017 |
| 7/5/2017 |
| 7/10/2017 |
| 7/17/2017 |
| 7/21/2017 |
| 7/24/2017 |
| 7/28/2017 |
| 7/29/2017 |
| 1/8/2018 |
| 1/14/2018 |
| 3/8/2018 |
| 3/15/2018 |
| 3/23/2018 |
| 4/7/2018 |

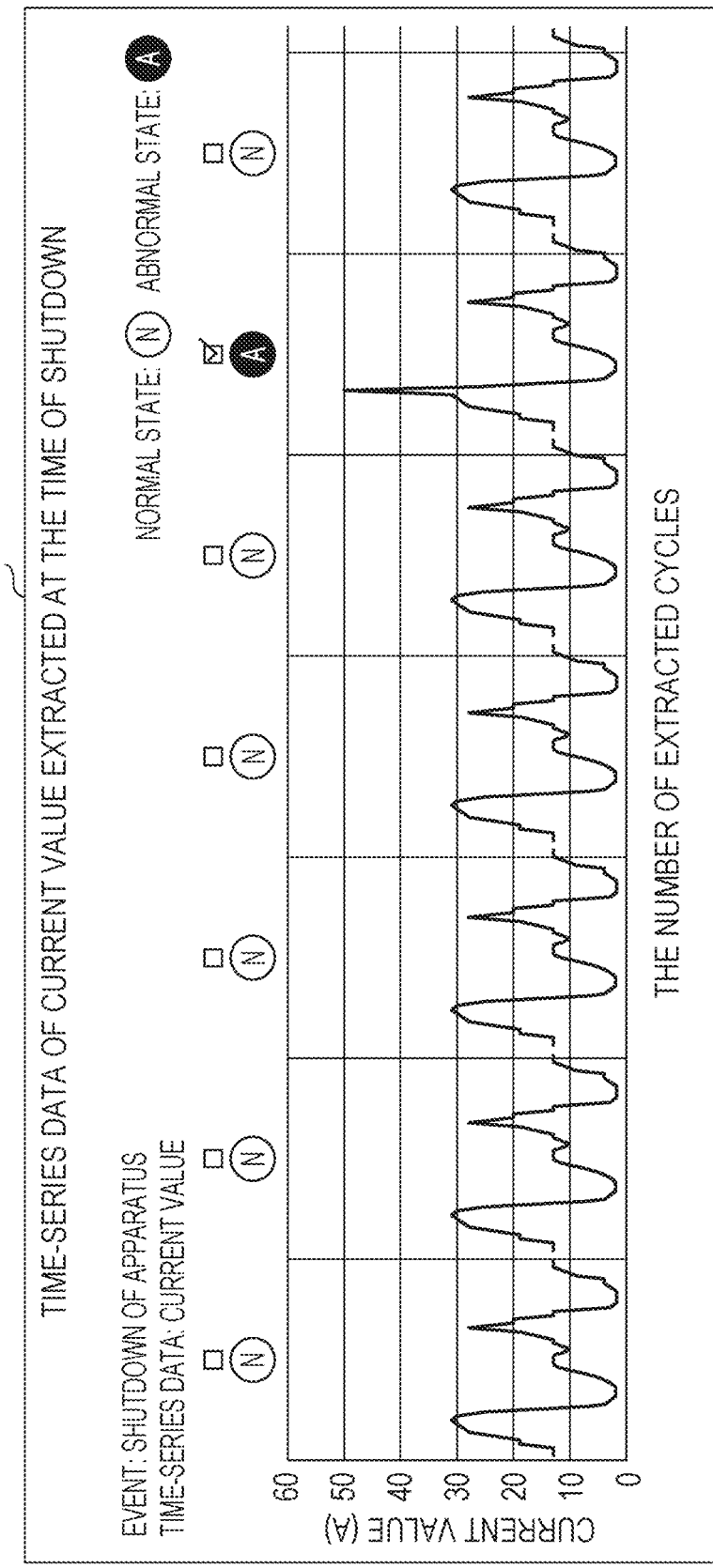

INFORMATION PROCESSING METHOD, INFORMATION PROCESSING APPARATUS, CONTROL PROGRAM, STORAGE MEDIUM, METHOD OF MANUFACTURING PRODUCT, AND METHOD OF ACQUIRING LEARNING DATA

BACKGROUND

Field

The present disclosure relates to an information processing method and an information processing apparatus.

Description of the Related Art

The operating status of a mechanical apparatus can change at every moment depending on, for example, the change in status of a constituent component. In the below description, an operating status within an allowable range based on the use purpose of the mechanical apparatus is referred to as a normal state, and an operating status outside of such allowable range is referred to as a fault state. A mechanical apparatus in the fault state can cause problems. For example, if a manufacturing machine is in the fault state, the manufacturing machine may manufacture a defective product or stop a production line by causing a malfunction.

To suppress the occurrence of the fault state as much as possible, in general, a maintenance operation is performed (on a regular or irregular basis) on a manufacturing machine, for example, even if the manufacturing machine continuously repeats the same operation. Shortening an interval between maintenance operations can achieve an increase in preventive safety. However, if the frequency of the maintenance operation is excessively increased, the operation rate of the manufacturing machine decreases because it is necessary to stop the manufacturing machine from performing its usual operations, during the maintenance operation. Accordingly, it is desirable to be able to estimate the timing at which the fault state is likely to occur in a machine, for example, when the machine is in the normal state. A detection of the timing at which the fault state is likely to occur (the prediction of occurrence of a fault) can make it possible to avoid an excessive decrease in an operation rate, by having a maintenance operation performed for the machine at a time indicated by the detected timing.

As a method of predicting the timing of the occurrence of a fault, a method is known of preparing a post-learning model generated by machine learning of the state of a mechanical apparatus in advance and evaluating the state of the mechanical apparatus at the time of an evaluation by using the post-learning model. To increase prediction accuracy, it is important to construct a post-learning model suitable for the prediction of a fault. For such construction, it is important to prepare learning data (training data) used when the fault prediction model of a mechanical apparatus is generated by machine learning. To determine whether extracted data is suitable as learning data, a detailed analysis of data, such as the check of a waveform and the comparison between waveforms, is needed.

For example, Japanese Patent Laid-Open No. 2013-232061 discloses a trend graph display system. In Japanese Patent Laid-Open No. 2013-232061, a first region, a second region, and a third region are provided. In the first region, time-series data is displayed in accordance with the elapse of time. In the second region, time-series data in a specific period which has been selected in the first region by a user is displayed in an enlarged view. In the third region, time-series data corresponding to the specific period is displayed in tabular form. The comparison between pieces of time-series data is performed by comparing table data in the third region, which has been displayed in synchronization with a cursor representing a specific point in time in the second region selected by a user, with data at another point in time.

SUMMARY

Various embodiments of the present disclosure provide an information processing method that includes causing an information processing apparatus to display a first image on which a plurality of pieces of partial time-series data of a physical quantity regarding a state of a mechanical apparatus are displayed, causing the information processing apparatus to display a second image on which the plurality of pieces of partial time-series data are displayed at intervals different from intervals at which the plurality of pieces of partial time-series data are displayed on the first image, and causing the information processing apparatus to display a first mark marking first partial time-series data that is predetermined one of the plurality of pieces of partial time-series data displayed on the first image and a second mark marking second partial time-series data that is one of the plurality of pieces of partial time-series data displayed on the second image and that corresponds to the first partial time-series data.

Further features of the present disclosure will become apparent from the following description of example embodiments with reference to the attached drawings.

BRIEF DESCRIPTION OF THE DRAWINGS

FIG. 3 is a flowchart describing a control method according to an embodiment.

FIG. 4A is a diagram illustrating examples of time-series data collected by a time-series data display apparatus.

FIG. 4B is a diagram illustrating examples of event data collected by a time-series data display apparatus.

FIG. 16 is a diagram illustrating a display screen according to an embodiment.

DESCRIPTION OF THE EMBODIMENTS

Figure 1:
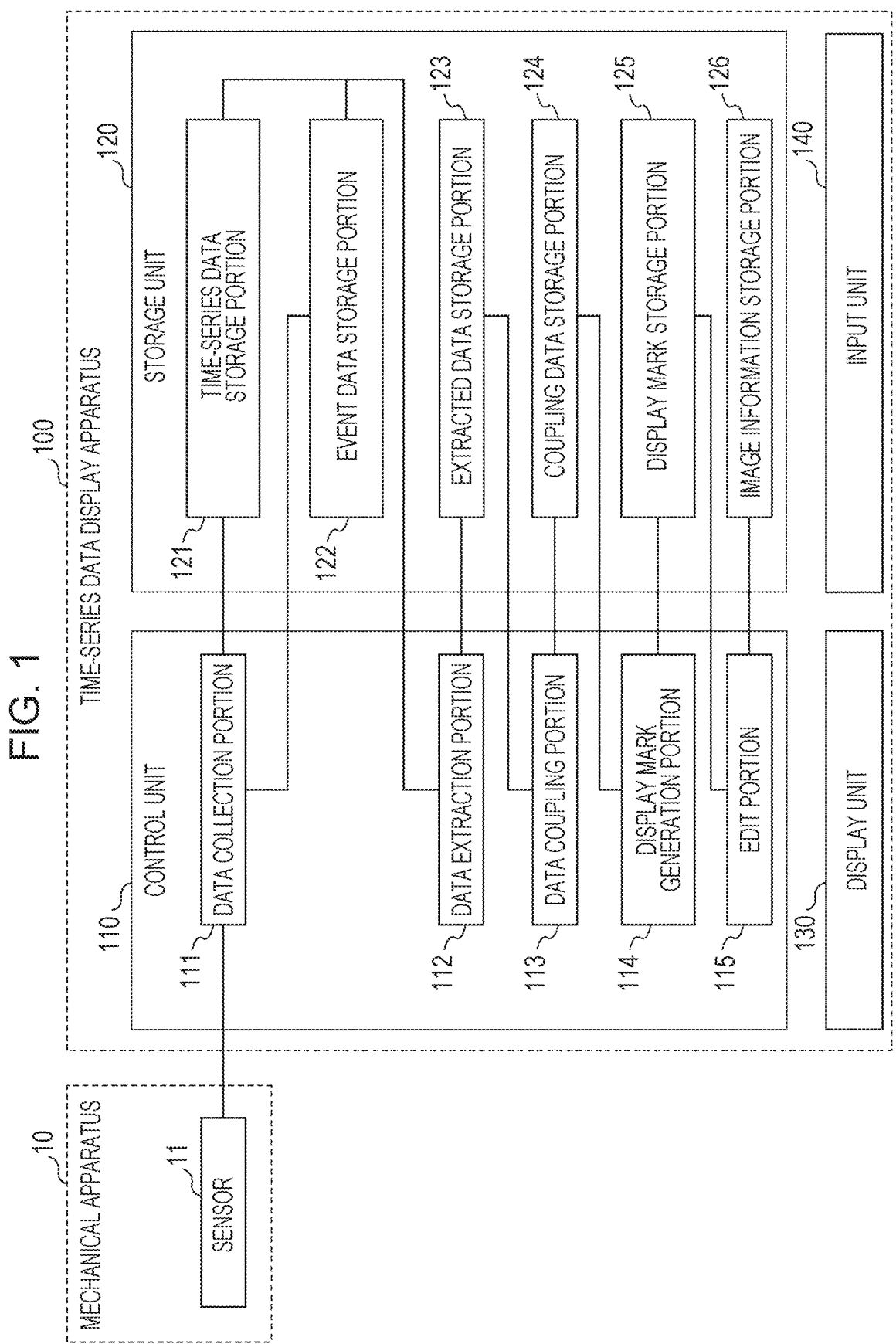
FIG. 1 is a schematic functional block diagram describing functional blocks included in a time-series data display apparatus according to an embodiment.

In general, in order to manage the operation status of a mechanical apparatus, measurement is performed for various parameters (physical quantities) in the mechanical apparatus and a massive amount of time-series data is acquired. For the construction of a post-learning model suitable for the prediction of a fault in a mechanical apparatus, it is necessary to extract data from the acquired massive amount of data as appropriate and perform detailed data analysis such as the check and comparison of waveforms to determine whether the data can be used as learning data.

However, in the case of an industrial robot deployed on a production line, the collection of pieces of time-series data needs to be performed for a long period of time because the frequency of occurrence of a fault is low. Pieces of time-series data are collected to manage the operation status of a mechanical apparatus. Accordingly, the number of measurement parameters is large, a sampling rate needs to be high for the detailed analysis of, for example, a waveform, and the amount of collected pieces of data becomes massive. Thus, in the case where data regarding a fault that irregularly occurs is extracted from among pieces of data collected at a high sampling rate for a long period, a data display method in the related art places a great workload on a worker and reduces efficiency and accuracy of a work.

In Japanese Patent Laid-Open No. 2013-232061, cursors are displayed which move in synchronization with each other in a trend graph for a specific period and a table representing data corresponding to the trend graph. However, in the case where pieces of time-series data collected for a long period are displayed in graph form, the amount of time-series data is massive and therefore needs to be displayed in an enlarged view. Accordingly, like a data display method in the related art, this method complicates the check and comparison of detailed behaviors of pieces of time-series data.

There are needs for an information processing method and an information processing apparatus with which a worker can easily perform the check and comparison of pieces of partial data optionally selected from among collected pieces of time-series data.

An information processing method and an information processing apparatus according to an embodiment of the present disclosure will be described with reference to the accompanying drawings. In drawings that will be referred to in the description of embodiments below, elements denoted by the same reference numerals have the same functions unless otherwise described.

First Embodiment

FIG. 1 is a schematic diagram describing functional blocks included in an information processing apparatus according to an embodiment. Although functional elements required for the description of a feature of the present embodiment are illustrated as functional blocks in FIG. 1, illustration of general functional elements not directly related to the problem-solving principle of the present disclosure is omitted. In addition, each functional element illustrated in FIG. 1 is functionally conceptual, and does not necessarily have to be physically configured as illustrated. For example, a specific configuration regarding the distribution and integration of respective functional blocks is not limited to the illustrated example, and all or part thereof can be functionally or physically distributed or integrated by optional unit in accordance with use conditions or the like.

As illustrated in FIG. 1, a time-series data display apparatus 100 serving as an information processing apparatus according to an embodiment is communicably connected to a mechanical apparatus 10 that is a measurement target.

Examples of the mechanical apparatus 10 include various industrial apparatuses, such as an industrial robot and a manufacturing apparatus installed on a production line. The mechanical apparatus 10 includes various sensors 11 for measuring a physical quantity regarding the state thereof. For example, in the case where the mechanical apparatus 10 is an articulated robot, a sensor for measuring the current value of a motor for driving a joint, an angle sensor of a joint, and a sensor for measuring a speed, vibration, or sound can be provided. However, these are merely examples, and sensors of appropriate types and numbers can be provided as the sensors 11 at appropriate positions depending on the type, use purpose, and the like of the mechanical apparatus 10. As the sensors 11, various sensors such as a force sensor, a torque sensor, a vibration sensor, a sound sensor, an image pickup sensor, a distance sensor, a temperature sensor, a humidity sensor, a flow rate sensor, a pH sensor, a pressure sensor, a viscosity sensor, and a gas sensor can be used. Although only a single sensor 11 is illustrated in FIG. 1 for the sake of convenience of illustration, a plurality of sensors capable of communicating with the time-series data display apparatus 100 are typically provided.

The mechanical apparatus 10 is communicably connected to the time-series data display apparatus 100 serving as an information processing apparatus in a wired or wireless manner. The time-series data display apparatus 100 can obtain data measured by the sensor 11 through communication. Functional blocks included in the time-series data display apparatus 100 will be sequentially described below. The time-series data display apparatus 100 includes a control unit 110, a storage unit 120, a display unit 130, and an input unit 140.

The control unit 110 includes a plurality of functional blocks, and these functional blocks are constituted by, for example, a central processing unit (CPU) of the time-series data display apparatus 100 reading and executing a control program stored in, for example, a storage device or a non-transitory storage medium. Alternatively, part or all of the functional blocks may be constituted by hardware such as an application-specific integrated circuit (ASIC) included in the time-series data display apparatus 100.

The storage unit 120 includes a time-series data storage portion 121, an event data storage portion 122, an extracted data storage portion 123, a coupling data storage portion 124, a display mark storage portion 125, and an image information storage portion 126. Each of these portions included in the storage unit 120 is configured by being appropriately assigned to a storage region of a storage device, such as a hard disk drive, a random access memory (RAM), or a read-only memory (ROM). The storage unit 120 is a data storage unit that stores various types of pieces of data required for generation of an image on which time-series data is easily visible.

The display unit 130 and the input unit 140 are user interfaces included in the time-series data display apparatus 100. As the display unit 130, a display device, such as a liquid crystal display or an organic electroluminescent (EL) display is used. As the input unit 140, an input device, such as a keyboard, a jog dial, a mouse, a pointing device, or a sound input device is used.

A data collection portion 111 included in the control unit 110 acquires time-series data and event data of a mechanical apparatus from the mechanical apparatus 10 and stores the time-series data and the event data in the time-series data storage portion 121 and the event data storage portion 122, respectively. The data collection portion 111 can also be referred to as a data acquisition portion.

The data collection portion 111 collects pieces of time-series data of a physical quantity regarding the state of the mechanical apparatus 10, such as a current, a speed, a pressure, a vibration, sound, or the temperature of each portion measured by the sensor 11 in the mechanical apparatus 10 and stores them in the time-series data storage portion 121. Alternatively, the data collection portion 111 may calculate, from the measurement values of the sensor 11, the maximum value, the minimum value, an average, an integrated value, a value obtained by converting into a frequency region by integration, a differential value, or a quadratic differential value in each predetermined period and store it in the time-series data storage portion 121.

The data collection portion 111 collects pieces of event data regarding an event that occurs at the mechanical apparatus 10 and stores them in the event data storage portion 122. A predetermined state of the mechanical apparatus 10 is set as an event, and, for example, pieces of information about a time at which the event has occurred are collected and stored in the event data storage portion 122. For example, in the case where the shutdown state of the mechanical apparatus 10 that continuously performs a repetitive operation (cycle operation) in a normal state is set as an event, the date of occurrence of the shutdown state is stored in the event data storage portion 122.

A fault or maintenance that is the cause of the shutdown state usually occurs at irregular or long intervals. An information processing apparatus according to an embodiment is suitable for handling such an event that occurs discretely or irregularly.

A data extraction portion 112 extracts partial time-series data regarding an event from among pieces of time-series data stored in the time-series data storage portion 121 on the basis of event data stored in the event data storage portion 122 and stores the extracted partial time-series data in the extracted data storage portion 123. The data extraction portion 112 can also be referred to as a data extraction portion. For example, the data extraction portion 112 may generate an image on which the extracted partial time-series data is placed on a linear scale for which time is set as an index and store the image in the extracted data storage portion 123.

For example, in the case where extraction conditions (predetermined conditions) are the shutdown of the mechanical apparatus 10, data on the date of occurrence of the shutdown of the mechanical apparatus 10 is read from the event data storage portion 122 as event data.

On the basis of the event data, for example, the measurement values of the sensor 11 collected in an operation cycle one time before the mechanical apparatus 10 has stopped are extracted and stored in the extracted data storage portion 123 as partial time-series data. Alternatively, the maximum value, the minimum value, an average, an integrated value, a value obtained by converting into a frequency region by integration, a differential value, or a quadratic differential value in each predetermined period calculated from the measurement values obtained one operation before the mechanical apparatus 10 has stopped may be extracted from the time-series data storage portion 121. The extracted value may be stored in the extracted data storage portion 123 as partial time-series data. The generated image can be displayed on the display unit 130 or printed by a printer (not illustrated) in accordance with the need of a worker (an operator).

The case has been described where one type of event data is stored in the event data storage portion 122, but there is a case where a plurality of types of pieces of event data are stored in the event data storage portion 122. In this case, an operator may select a predetermined event from among the multiple types of pieces of event data via the input unit 140, and the data extraction portion 112 may extract partial time-series data regarding the selected predetermined event and store the extracted partial time-series data in the extracted data storage portion 123. Alternatively, a predetermined event selected from among the multiple types of pieces of event data may be registered in advance, and partial time-series data regarding the registered predetermined event may be automatically extracted and stored in the extracted data storage portion 123.

A data coupling portion 113 generates a graph on which pieces of partial time-series data regarding an event are arranged on the basis of partial time-series data stored in the extracted data storage portion 123. For example, the data coupling portion 113 generates a graph on which pieces of partial time-series data regarding an event are coupled or placed adjacent to each other along a horizontal axis representing the number of pieces of data and stores the graph in the coupling data storage portion 124. The generated graph can be displayed on the display unit 130 or printed by a printer (not illustrated) in accordance with the need of a worker (an operator).

A display mark generation portion 114 generates an image by superimposing a display mark enabling the easy recognition of selected optional partial time-series data on the image stored in the extracted data storage portion 123 or the coupling data storage portion 124. For example, a display mark may be superimposed in a rectangular region to make the whole of the selected partial time-series data recognizable. In the case where the position of the selected partial time-series data needs to be known, a display mark may be superimposed on the selected partial time-series data as a point. The image on which a display mark is superimposed is stored in the display mark storage portion 125. At that time, information about the selected partial time-series data may be stored with the image. Examples of a display mark include a mouse cursor, a mouse pointer, and a region displayed by the drag operation of a mouse.

An edit portion 115 edits the image generated by the data extraction portion 112 or the data coupling portion 113 to allow an operator to conveniently use the image (e.g., to more easily understand information) at the time of performance of an optional operation and stores the edited image in the image information storage portion 126. The display mark generation portion 114 can also be referred to as an image edit portion or an edit portion.

Figure 2:
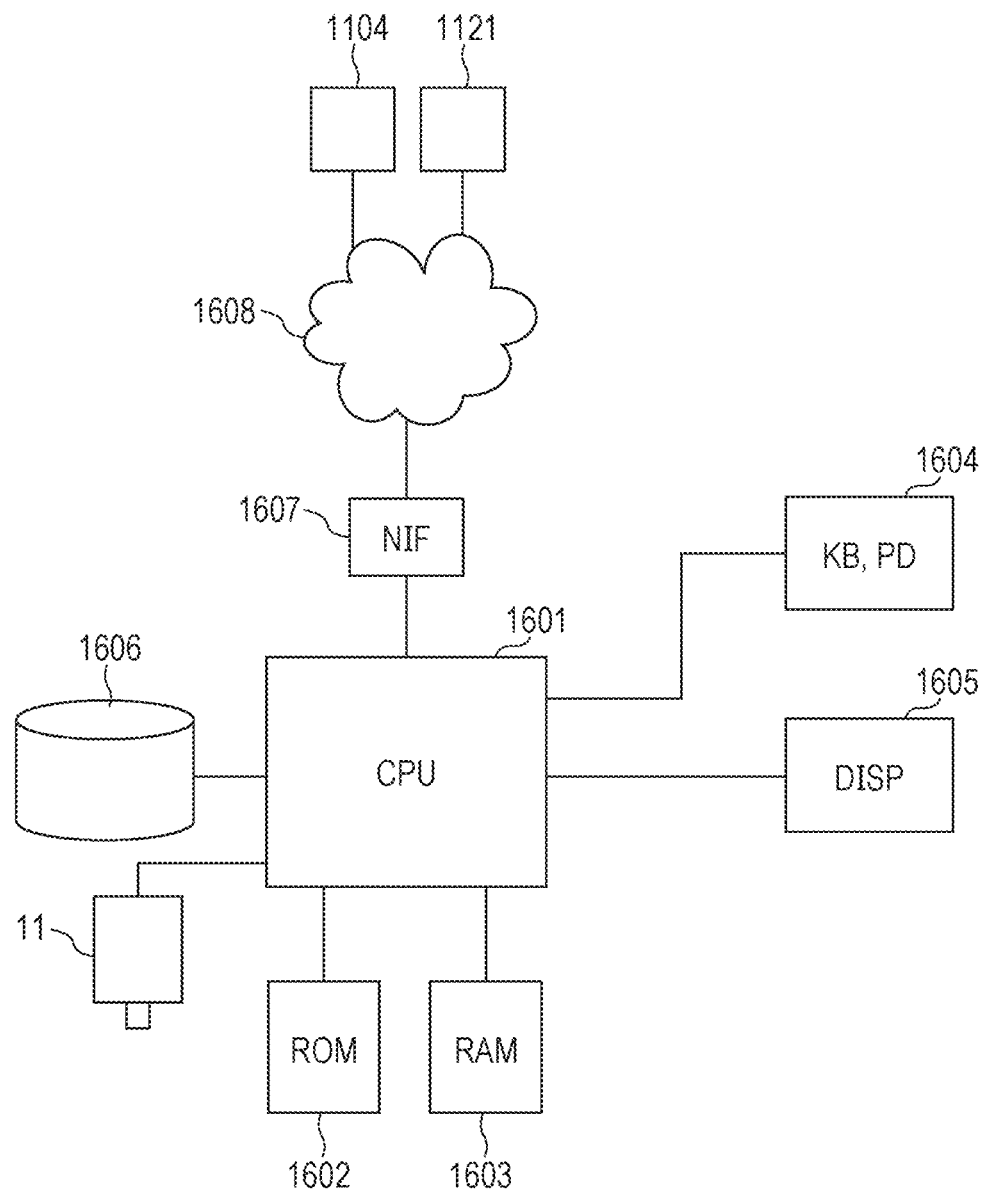
FIG. 2 is a schematic diagram illustrating an example hardware configuration of a time-series data display apparatus according to an embodiment.

Next, an example hardware configuration of a time-series data display apparatus according to an embodiment will be schematically illustrated in FIG. 2. As illustrated in FIG. 2, a time-series data display apparatus can include personal computer (PC) hardware including a CPU 1601 as a main controller, a ROM 1602 as a storage unit, and a RAM 1603. The ROM 1602 can store information such as a processing program for the execution of an information processing method to be described below. The RAM 1603 is used as, for example, a work area for the CPU 1601 when the information processing method is performed. An external storage device 1606 is connected to the PC hardware. The external storage device 1606 is constituted by, for example, a hard disk drive (HDD), a solid-state device (SSD), an external storage device of another system that is mounted thereon via a network.

A control program that the CPU 1601 executes to provide an information processing apparatus or an information processing method according to an embodiment can be stored in a storage unit such as the external storage device 1606 constituted by an HDD or an SSD or an electrically erasable programmable ROM (EEPROM) region of the ROM 1602. In this case, the processing program that the CPU 1601 executes to provide the information processing method (e.g., a method of displaying time-series data) is supplied to each of the above-described storage units via a network interface 1607, and can be updated to another new program. Alternatively, the processing program that the CPU 1601 executes to provide the information processing method can be supplied to each of the above-described storage units via various storage media, such as a magnetic disk, an optical disc, and a flash memory, and a drive device therefor, and the contents thereof can be updated. The various storage media, storage units, or storage devices that store a program with which the CPU 1601 can execute a process for realizing the information processing method constitute computer-readable recording media for an information processing method or an information processing apparatus according to an embodiment of the present disclosure.

The sensor 11 illustrated in FIG. 1 is connected to the CPU 1601. Although the sensor 11 is illustrated as being directly connected to the CPU 1601 for simpler illustration in FIG. 2, the sensor 11 may be connected to the CPU 1601 via, for example, an IEEE 488 (a so-called general-purpose interface bus (GPIB)). The sensor 11 may be communicably connected to the CPU 1601 via the network interface 1607 and a network 1608.

The network interface 1607 can be constitute by using, for example, a communication standard of wired communication such as IEEE 802.3, or a communication standard of wireless communication such as IEEE 802.11 or 802.15. The CPU 1601 can communicate with external apparatuses 1104 and 1121 via the network interface 1607. For example, in the case where a target for which time-series data is displayed is an industrial robot, each of the external apparatuses 1104 and 1121 may be an integral control apparatus such as a programmable logic controller (PLC) or a sequencer, a management server, or the like that is disposed for the control or management of the industrial robot.

In the example illustrated in FIG. 2, an operation unit 1604 corresponding to the input unit 140 illustrated in FIG. 1 and a display unit 1605 corresponding to the display unit 130 illustrated in FIG. 1 are connected to the CPU 1601 as user interface (UI) devices. The operation unit 1604 can be constituted by a terminal such as a handy terminal, a device such as a key board, a jog dial, a mouse, a pointing device, a sound input device, or a control terminal including them. The display unit 1605 may be any device as long as information about processing performed by the data extraction portion 112 and the data coupling portion 113 can be displayed on a display screen thereof and, may be, for example, a liquid crystal display device.

Next, an information processing method (method of displaying time-series data) performed by the time-series data display apparatus 100 will be described with reference to the flowchart illustrated in FIG. 3. FIG. 3 illustrates an example process performed by a time-series data display apparatus. FIGS. 4A and 4B are diagrams illustrating examples of various data collected by the time-series data display apparatus 100. FIG. 4A is a diagram illustrating examples of time-series data, and FIG. 4B is a diagram illustrating examples of event data.

In step S101, the time-series data display apparatus 100 collects pieces of time-series data and pieces of event data from the mechanical apparatus 10 and the sensor 11. FIG. 4A illustrates examples of time-series data collected by the time-series data display apparatus 100. This time-series data is obtained by periodically sampling and measuring the driving current of an industrial robot included in the mechanical apparatus 10. The data collection portion 111 in the time-series data display apparatus 100 collects pieces of time-series data from the sensor 11 in the mechanical apparatus 10 and stores them in the time-series data storage portion 121.

Figure 5:
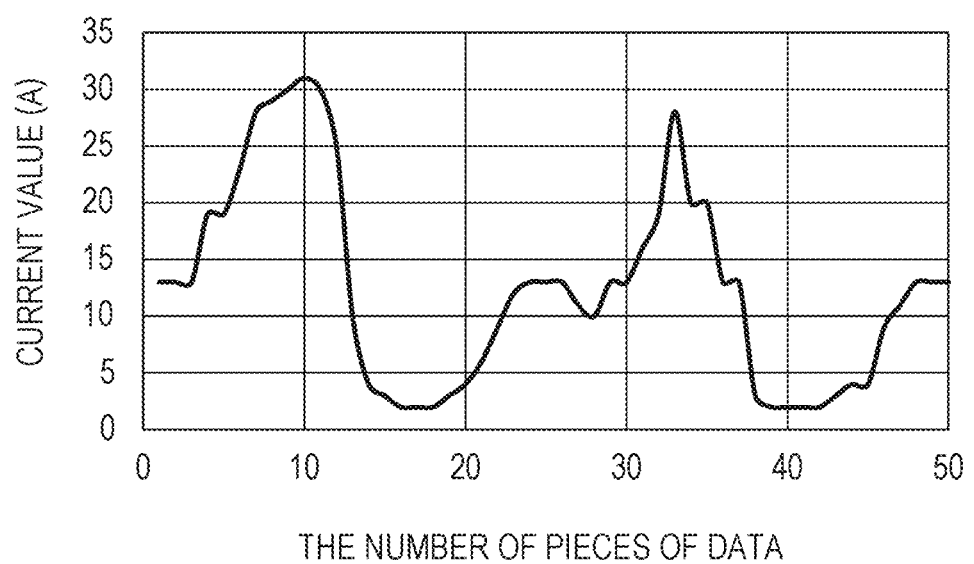
FIG. 5 is a graph representing pieces of time-series data of a one-time repetitive operation collected from a mechanical apparatus.
Figure 6A:
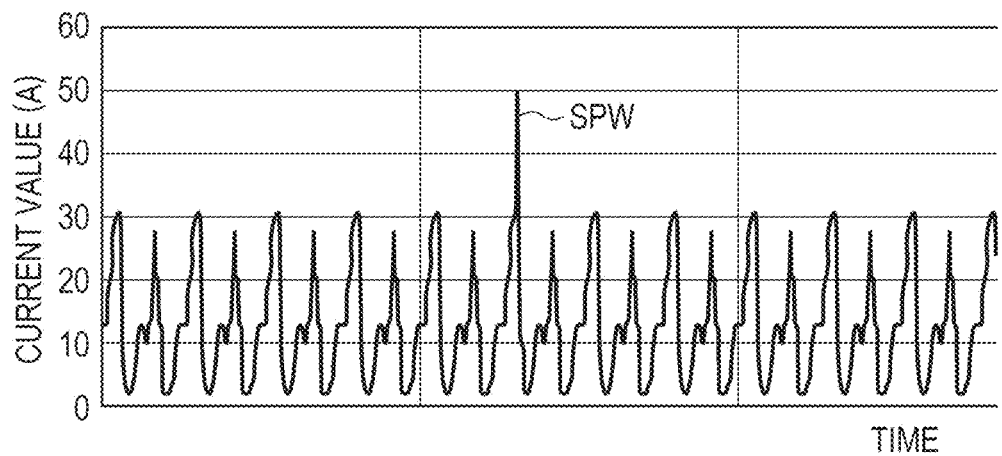
FIG. 6A is a graph representing pieces of time-series data collected when a repetitive operation is continuously performed.
Figure 6B:
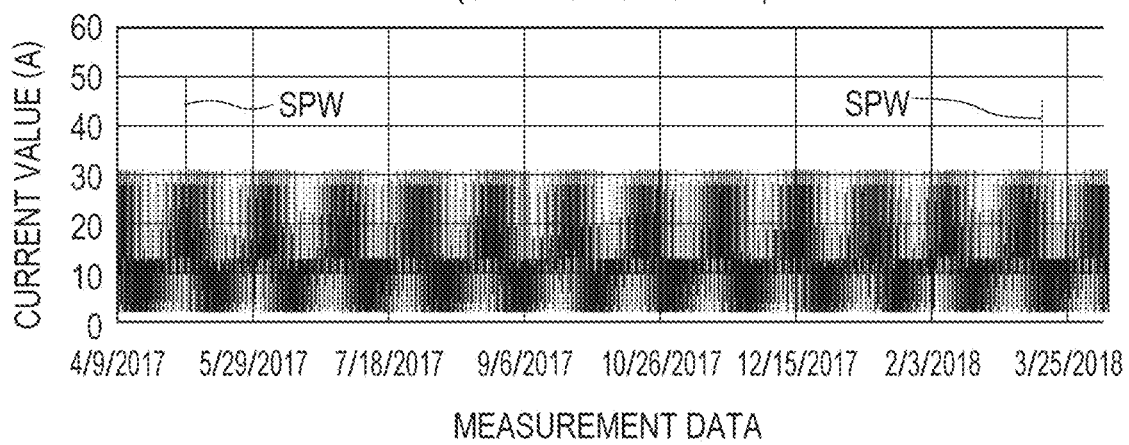
FIG. 6B is a graph representing pieces of time-series data collected for a long time in a compressed manner in a time axis direction.

Here, pieces of time-series data to be collected will be described in more detail. FIG. 5 illustrates time-series data of a one-time cycle operation when an industrial robot included in the mechanical apparatus 10 normally operates in the form of a current waveform graph. On the images illustrated in FIGS. 6A and 6B, a plurality of current waveform graphs illustrated in FIG. 5 are provided. FIG. 6A illustrates pieces of time-series data collected when the industrial robot continuously performs the cycle operation in the form of a current waveform graph. It is apparent from FIG. 6A that there is a waveform SPW having a specific amplitude on the graph. FIG. 6B is a graph representing pieces of time-series data collected for a long time in a more compressed manner in a time axis direction as compared with the graph illustrated in FIG. 6A. It is apparent from FIG. 6B that there are the two waveforms SPW having a specific amplitude on the graph. However, it is difficult to perform the detailed check and comparison of the specific waveforms on the image illustrated in FIG. 6B, because the waveform of each cycle operation is deformed in the time axis direction.

Next, FIG. 4B illustrates examples of event data collected by the time-series data display apparatus 100. These pieces of event data are times at which the shutdown of the industrial robot included in the mechanical apparatus 10 set as an event has occurred. In this example, a shutdown caused by a regularly or irregularly performed maintenance operation and a shutdown caused by a fault that irregularly occurs are set as events. In parallel with the collection of pieces of time-series data, for example, the data collection portion 111 receives control information from a control unit for managing the operation of the mechanical apparatus 10 to collect pieces of event data and stores the collected pieces of event data in the event data storage portion 122.

Referring back to FIG. 3, in step S102, the data extraction portion 112 extracts partial time-series data regarding a predetermined event from among the pieces of time-series data stored in the time-series data storage portion 121. The predetermined event means an event that a worker (an operator) has optionally selected from among the pieces of event data stored in the event data storage portion 122, but may be automatically selected by the control unit 110.

For example, partial time-series data regarding the predetermined event is extracted from among the pieces of time-series data illustrated in FIG. 4A on the basis of the event data illustrated in FIG. 4B. Specifically, time-series data regarding an operation one cycle before a point of time at which the selected predetermined event has occurred (the shutdown of the industrial robot) is extracted as partial time-series data. This is a merely example, and, for example, time-series data apart from the time of occurrence of the predetermined event by a predetermined number of operation cycles may be extracted or pieces of time-series data in a plurality of continuous operation cycles may be extracted as a single piece of partial time-series data. Alternatively, time-series data itself in an operation cycle in which the predetermined event has occurred may be extracted as partial time-series data. The extracted partial time-series data is stored in the extracted data storage portion 123 along with time information regarding the partial time-series data.

Figure 7:
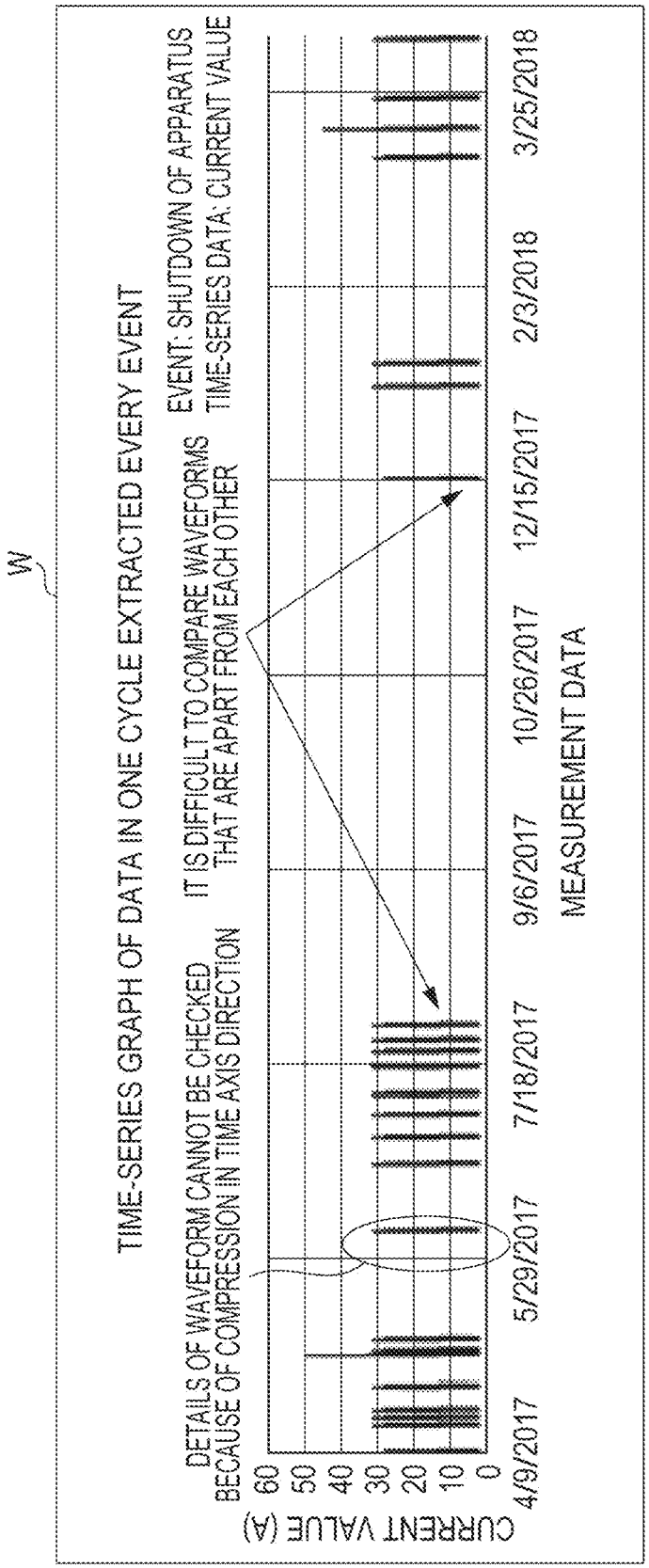
FIG. 7 is a diagram illustrating extracted partial time-series data aligned on a linear scale (i.e., an absolute time axis) for which time is set as an index.

Here, it is assumed that the extracted partial time-series data is placed on a linear scale for which time is set as an index (i.e., an absolute time axis). On a display screen W schematically illustrated in FIG. 7, most of time-series data during a continuous operation is not extracted and is therefore not illustrated and only the waveform of partial time-series data regarding the event is illustrated in graph form. Accordingly, redundancy is significantly reduced as compared with the graph illustrated in FIG. 6B. However, in the case where pieces of time-series data have been collected for a long period, it is difficult to check the details of each waveform of partial time-series data on the display screen W because the waveform is compressed and deformed in the time axis direction. If the time axis direction is enlarged for ease of observation of the shape of a waveform, a case may arise where a plurality of waveforms to be compared with each other protrude from the screen because pieces of partial time-series data are spaced from each other at irregular intervals.

In this embodiment, in step S103, the data coupling portion 113 serving as a processing portion couples the pieces of partial time-series data stored in the extracted data storage portion 123 and stores a result of the coupling in the coupling data storage portion 124. That is, the data coupling portion 113 generates an image (coupling data) on which the distance between pieces of information (e.g., graphs) regarding respective extracted pieces of partial time-series data is set to be smaller than that between pieces of information placed on a linear scale for which time is set as an index. The data coupling portion 113 places pieces of information (e.g., graphs) regarding adjacent pieces of partial time-series data such that they are coupled to each other or spaced at predetermined intervals (short intervals). For example, in FIG. 7, image processing is performed such that the distance between the waveforms of respective pieces of partial time-series data in the horizontal-axis direction is set to zero or a predetermined small distance.

In step S104, a graph is displayed on the display unit 130 as an image using the extracted data stored in the extracted data storage portion 123. At that time, as assumed above, the extracted partial time-series data is placed on a linear scale for which time is set as an index (i.e., an absolute time axis) and displayed.

Subsequently, in step S105, a graph is displayed on the display unit 130 as an image using the coupling data stored in the coupling data storage portion 124. At that time, the image can be enlarged in the horizontal-axis direction as appropriate for ease of observation or comparison of waveforms. It is desired that the index (scale) of a graph on the horizontal axis be not an absolute time but the number of samples of original measurement data, the number of operation cycles, or the number of waveforms. The reason for this is that, when an absolute time is set as the index (scale) on the horizontal axis, the value of an index discontinuously jumps at a boundary between pieces of partial time-series data spaced from each other at irregular intervals and a worker cannot get intuitive understanding.

In step S105, the generated image is displayed using the display unit 130, but may be transmitted to another display apparatus different from the time-series data display apparatus 100 to cause the display apparatus to display the image or may be transmitted to a printer to cause the printer to print the image. That is, the output method of the generated image may be selected for the convenience of a worker (an operator).

Figure 8:
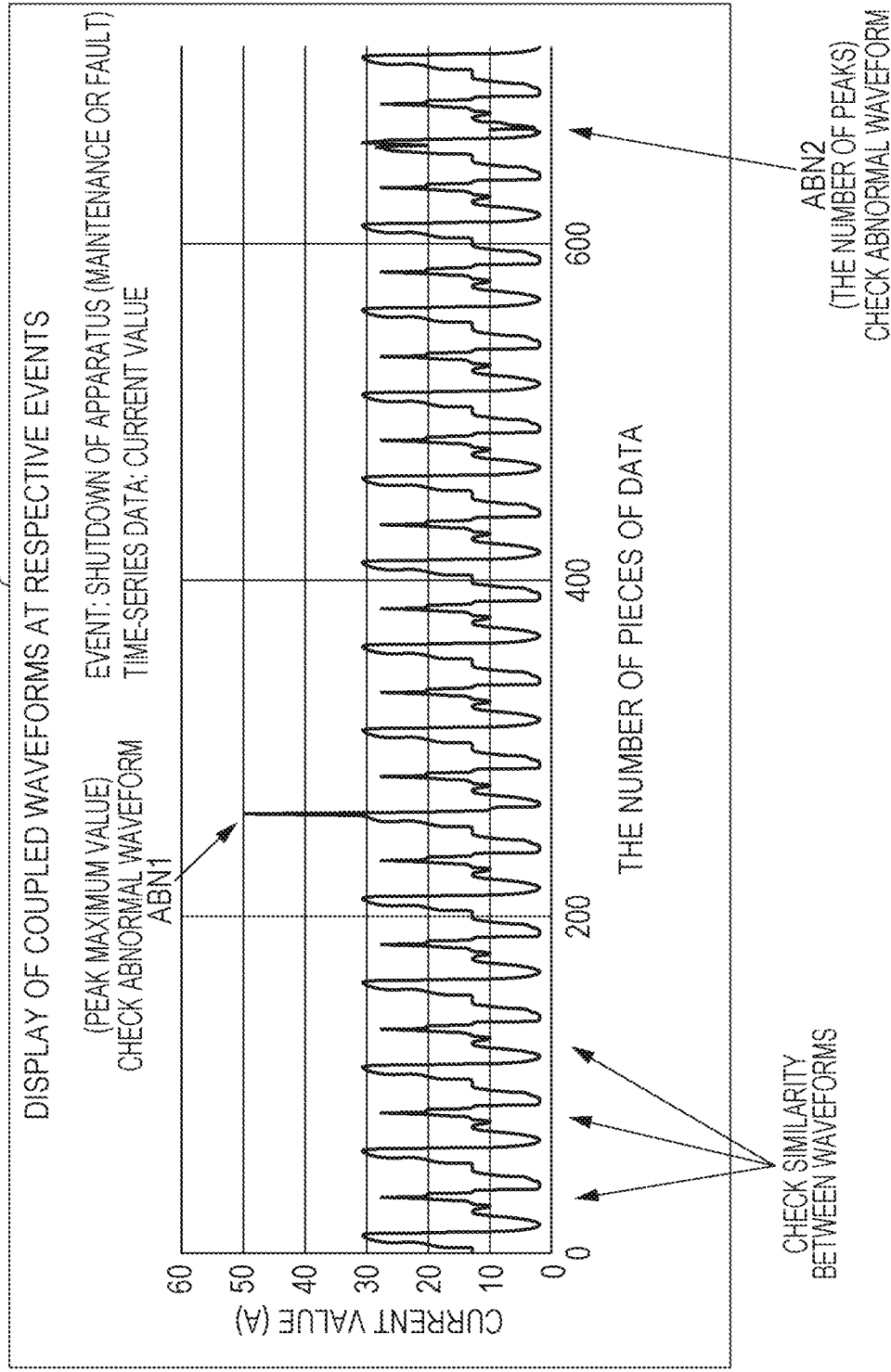
FIG. 8 is a diagram illustrating extracted partial time-series data aligned on a linear scale for which the number of pieces of data is set as an index.

FIG. 8 illustrates an example of an image displayed on the display screen W of the display unit 130 in step S105. The waveforms of pieces of partial time-series data regarding an event are coupled to be adjacent to each other in the horizontal-axis direction and are displayed. That is, the shutdown of an industrial robot is set as event data, partial time-series data corresponding to each event is extracted from among pieces of time-series data obtained by monitoring the current value of the industrial robot, and a graph on which the extracted pieces of partial time-series data are coupled is displayed. Thus, since only pieces of partial time-series data at the time of occurrence of an event are coupled and displayed, a worker (an operator) can very easily perform the check and comparison of graphs regarding the occurrence of the event.

Figure 9:
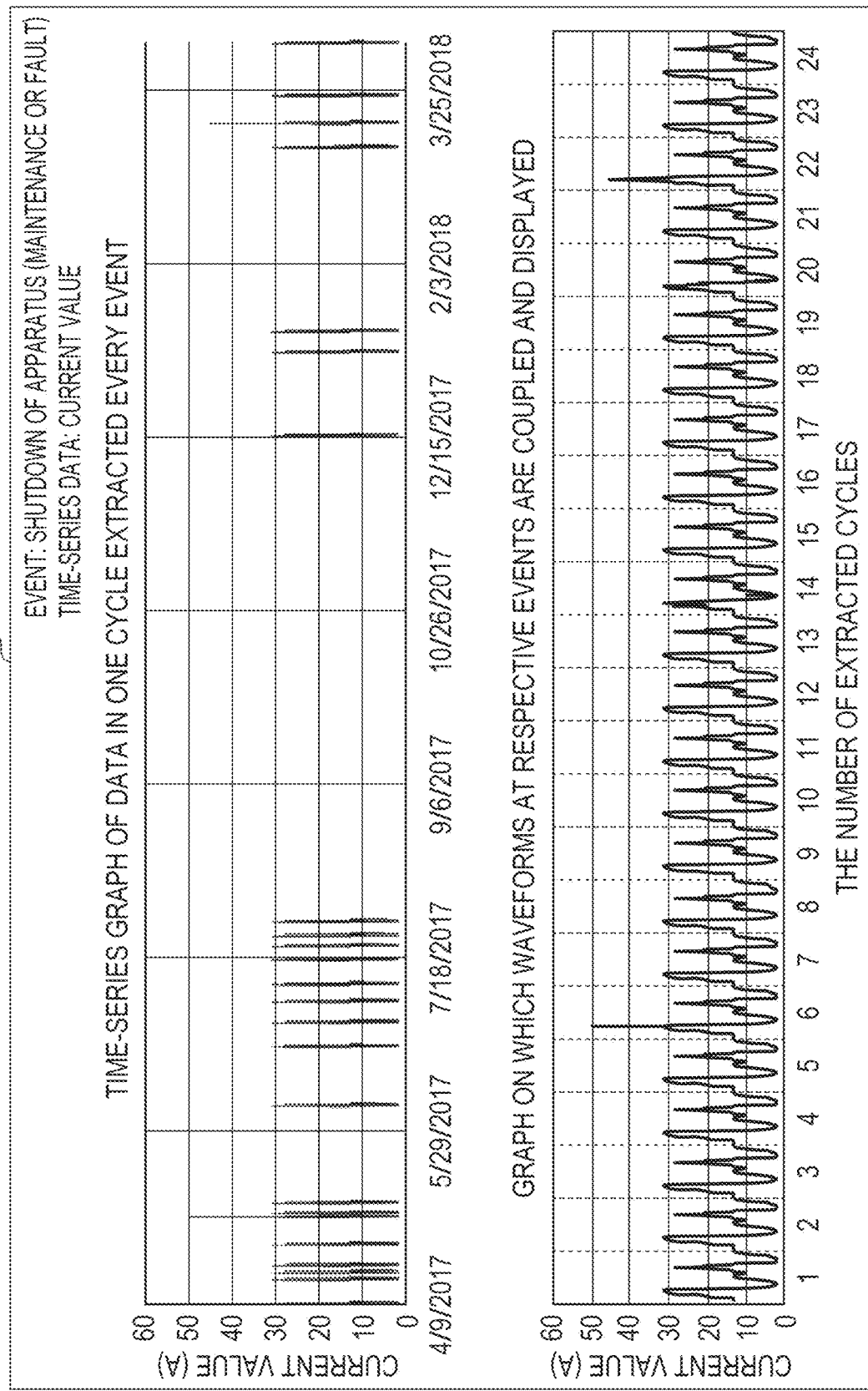
FIG. 9 is a diagram illustrating a display screen according to an embodiment.

FIG. 9 illustrates examples of images displayed on the display screen W of the display unit 130 in steps S104 and S105. The upper image is an image generated in step S104 on which extracted pieces of partial time-series data are placed on a linear scale for which time is set as an index. The lower image is an image generated in step S105 on which coupled pieces of partial time-series data are placed with the horizontal axis for which the number of samples of partial time-series data is set as an index. At the upper right of the screen W, contents of event data that is extraction conditions (predetermined conditions) and information indicating which type of physical quantity of time-series data is displayed (current value in FIG. 9) are displayed.

Subsequently, in step S106, the pieces of partial time-series data stored in the extracted data storage portion 123 and the coupling data storage portion 124 are displayed on the display screen W of the display unit 130 as illustrated in FIG. 9. At the time, the pieces of data are displayed so that optional partial time-series data in the image can be selected.

In step S107, the display mark generation portion 114 serving as a processing portion generates a display mark. The display mark is generated for ease of recognition of optional partial time-series data selected on the image displayed on the display screen W of the display unit 130. The display mark is superimposed on the image displayed on the display screen W of the display unit 130. Information about partial time-series data selected by a worker (an operator) using the display mark is stored in the display mark storage portion 125. A display mark that the display mark generation portion 114 superimposes on the image may have various shapes such as a linear shape, an arrow shape, a circle shape, a square shape, a star shape, a finger shape, and a shape for display of a region at the time of range selection on condition that a worker (an operator) can easily perform a work (operation) using these marks or easily recognize these marks.

Figure 10:
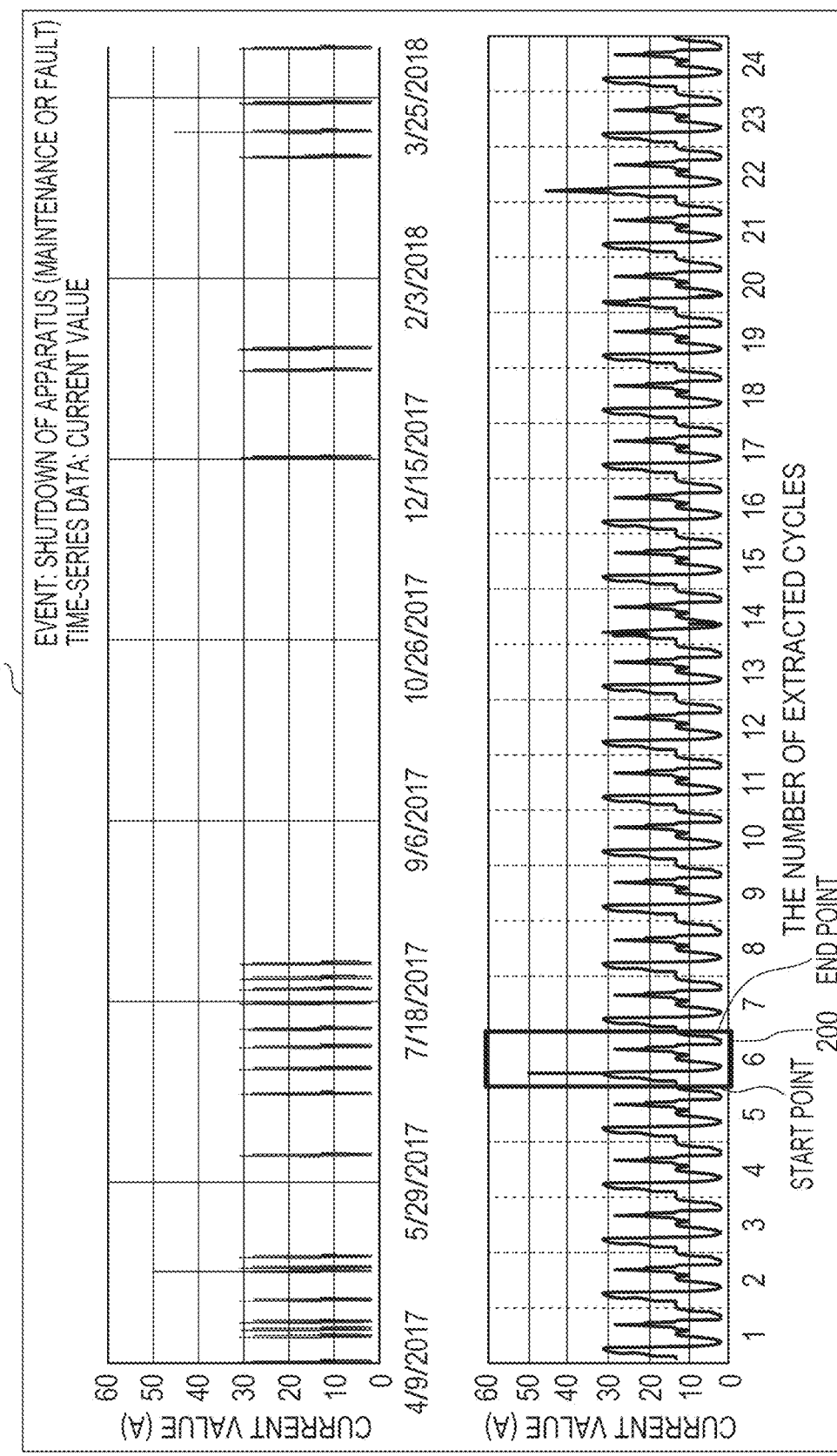
FIG. 10 is a diagram illustrating a display screen according to an embodiment.

FIG. 10 illustrates an example of an image on which a display mark 200 is superimposed which has been generated by the display mark generation portion 114 at the time of optional selection of partial time-series data on the image displayed on the display screen W of the display unit 130 in step S107. In FIG. 10, the display mark 200 superimposed on the image is rectangular in shape to allow a worker to easily recognize the waveform of the selected partial time-series data in one cycle. The rectangular display mark 200 is placed such that the start point and end point of one cycle of the selected partial time-series data fit on the display mark 200. The display mark 200 is transparently displayed to allow a worker to check the selected waveform in one cycle.

Subsequently, in step S108, the edit portion 115 serving as a processing portion refers to data regarding the selected optional partial time-series data stored in the display mark storage portion 125. In synchronization with the display mark 200 generated by the display mark generation portion 114, a display mark 201 for highlighting corresponding partial time-series data is displayed on the other image (the upper graph) to allow a worker to easily recognize the data. The image is edited such that information about the selected partial time-series data is displayed, and is stored in the image information storage portion 126.

Figure 11:
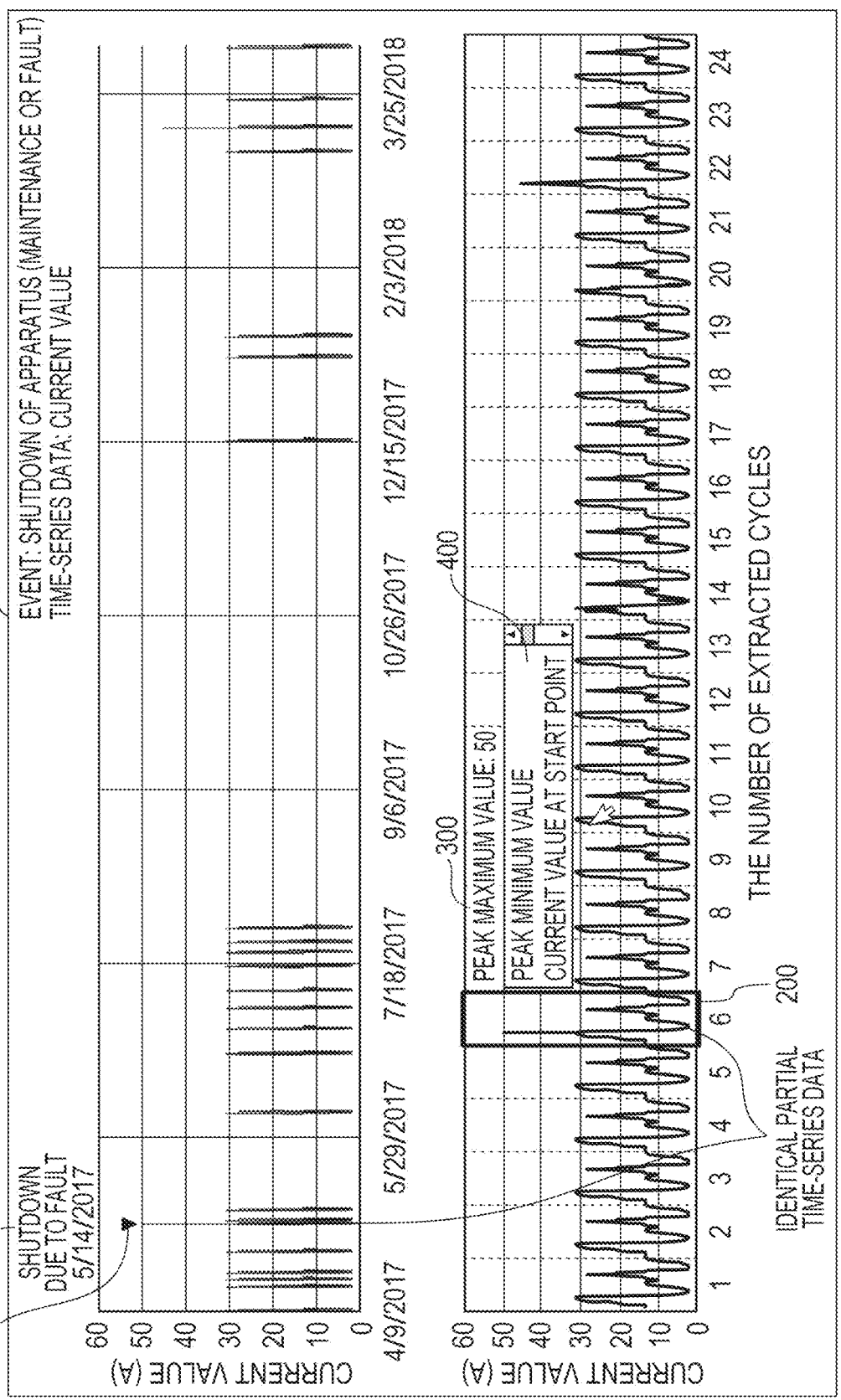
FIG. 11 is a diagram illustrating a display screen according to an embodiment.

FIG. 11 illustrates an image that has been subjected to edit processing of the edit portion 115 in step S108. The upper graph is generated in step S104 (graph on which pieces of partial time-series data are placed on a linear scale for which time is set as an index), and the lower graph is generated in step S105 (graph with a horizontal axis for which the number of samples of partial time-series data is set as an index). When optional partial time-series data is selected on the lower graph in step S106, the display mark 200 is superimposed on the lower graph to allow a worker to easily recognize the selected one cycle of partial time-series data in step S107.

In step S108, in synchronization with the display mark 200 for the selected partial time-series data, the display mark 201 shaped like an inverted triangle is displayed above data corresponding to the selected partial time-series data on the upper graph to allow a worker to easily recognize the corresponding data.

In addition, the time of occurrence of the selected partial time-series data and information about event data at the time of extraction of the partial time-series data in step S102 are displayed. An information content icon 301 indicates that an event associated with the selected partial time-series data is "fault shutdown" and has occurred or acquired on "5/14/2017 (May 14, 2017)". An information content icon 300 represents "peak maximum value: 50" that is information about the maximum peak value of a waveform in the region of the display mark 200 and is superimposed on the lower graph on which the display mark 200 is superimposed in step S107. The information content icon 300 represents the maximum peak value of a current value in this embodiment, but may represent the minimum peak value of a current value, a current value at a start point, or a current value at an end point. A graphical user interface may be provided to allow a worker to set the display contents of the information content icon 300 as appropriate. For example, by clicking or double-clicking the contents of the information content icon 300, a pull-down menu 400 is displayed. In the pull-down menu 400, information that a worker wants to display, such as a peak minimum value is displayed and is set by the worker as appropriate.

Thus, according to this embodiment, when a worker performs the check of the date and frequency of occurrence of a predetermined event or the check and comparison of detailed behaviors of extracted pieces of partial time-series data, the worker can perform it without selecting a specific period again. This leads to the easier operation of the worker. Since detailed information about partial time-series data is highlighted, the check and comparison of details of data can be more easily performed.

Second Embodiment

A single piece of partial time-series data is selected in the above embodiment, but a plurality of pieces of partial time-series data may be selected. This will be described in detail below. The description and illustration will be made below of the configurations of hardware and a control system that differ from the first embodiment. In addition, parts similar to those of the above embodiment are regarded as having similar configurations and functions, and the detailed description thereof is omitted.

Figure 12:
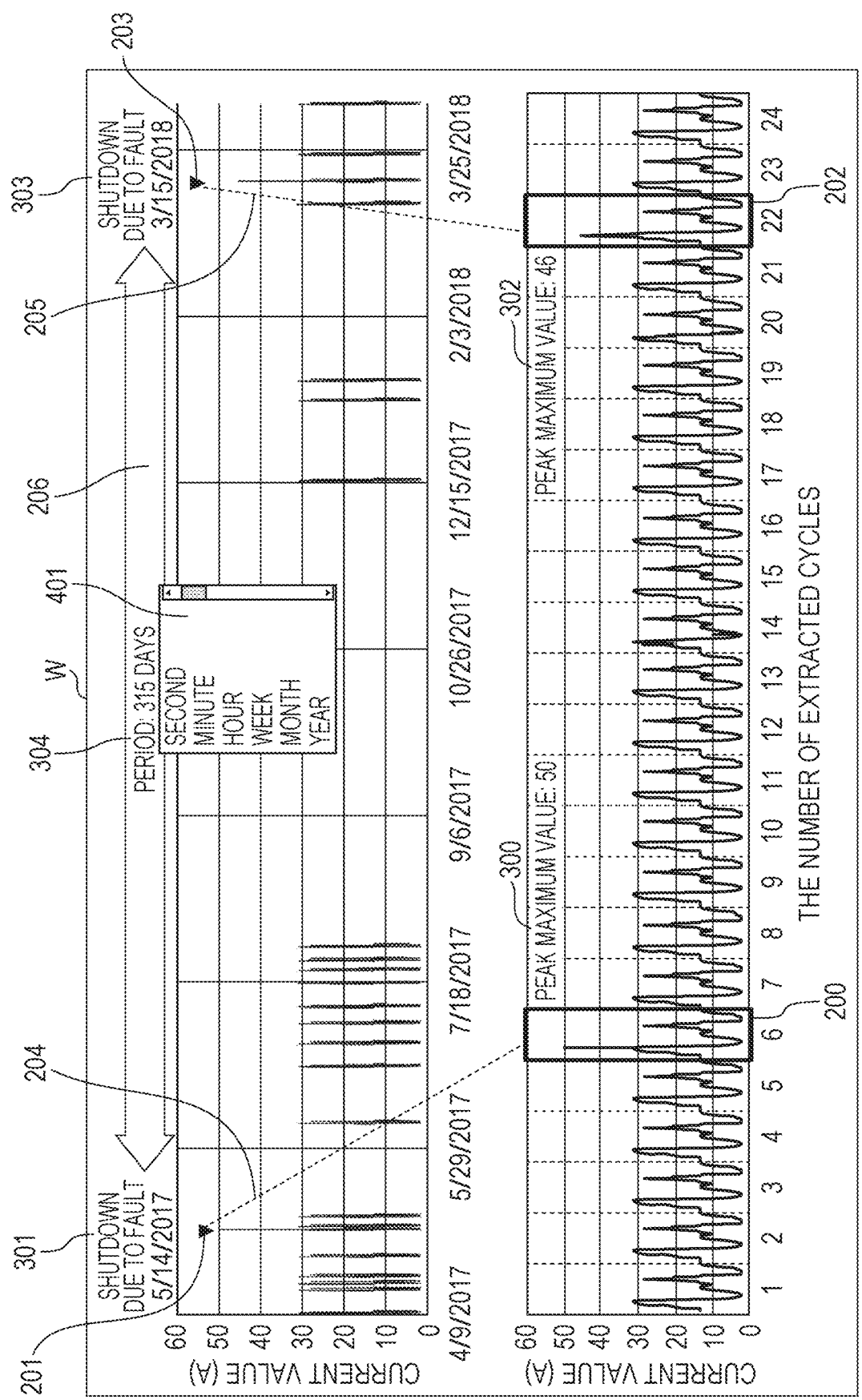
FIG. 12 is a diagram illustrating a display screen according to an embodiment.

FIG. 12 is a diagram illustrating the display screen W in this embodiment. The display control of the display screen W is performed by the display mark generation portion 114 and the edit portion 115. A plurality of pieces of partial time-series data are selected in step S106 in FIG. 3 and are displayed on the display screen W of the display unit 130. On the lower graph, the partial time-series data in the 6th cycle and the partial time-series data in the 22th cycle are selected. The display mark 200 is superimposed on the partial time-series data in the 6th cycle, and a display mark 202 is superimposed on the partial time-series data in the 22th cycle. Like in the above embodiment, the display mark 200 is placed such that the start point and end point of the partial time-series data in the 6th cycle fit on the display mark 200, and the display mark 202 is placed such that the start point and end point of the partial time-series data in the 22th cycle fit on the display mark 202.

To highlight partial time-series data on the upper graph corresponding to the partial time-series data in the 6th cycle on the lower graph, the display mark 201 shaped like an inverted triangle is displayed. To highlight partial time-series data on the upper graph corresponding to the partial time-series data in the 22th cycle on the lower graph, a display mark 203 shaped like an inverted triangle is displayed.

For the easy recognition of the relationships between these display marks, linear display marks 204 and 205 are displayed. The linear display mark 204 represents the relationship between the display marks 200 and 201. The linear display mark 205 represents the relationship between the display marks 202 and 203.

The information content icon 301 indicates that an event associated with the selected partial time-series data is "fault shutdown" and has occurred or acquired on "5/14/2017 (May 14, 2017)". An information content icon 303 similarly indicates that an event associated with the selected partial time-series data is "fault shutdown" and has occurred or acquired on "3/15/2018 (Mar. 15, 2018)". The information content icon 300 represents "peak maximum value: 50" that is information about the maximum peak value of a waveform in the 6th cycle in the region of the display mark 200 and is superimposed on the lower graph. An information content icon 302 similarly represents "peak maximum value: 46" that is information about the maximum peak value of a waveform in the 22th cycle in the region of the display mark 202 on the lower graph. Like in the above embodiment, the information content icons 300 and 302 may represent the minimum peak value of a current value. A graphical user interface may be provided to allow a worker to set the display contents of the information content icons 300 and 302 as appropriate.

In addition, an arrow-shaped display mark 206 representing the time-series relationship between the selected waveform in the 6th cycle and the selected waveform in the 22th is displayed, and an information content icon 304 representing how far apart these waveforms are on a time-series basis is displayed on the display mark 206. The information content icon 304 indicates that the waveform in the 6th cycle and the waveform in the 22th are apart from each other by "315 days" on a time-series basis. This is represented in units of days in this embodiment, but may be represented in units of seconds, minutes, hours, weeks, months, or years. Also in this case, a graphical user interface may be provided to allow a worker to set the display contents of the information content icon as appropriate. For example, by clicking or double-clicking the contents of the information content icon 304, a pull-down menu 401 is displayed. Various time-series intervals are displayed in the pull-down menu 401, and a worker sets one of them as appropriate.

The display mark 206 and the information content icon 304 are displayed between the pieces of partial time-series data on the upper graph in this embodiment, but may be displayed between pieces of partial time-series data on the lower graph. The information content icon 304 is superimposed on the display mark 206 in this embodiment, but may be displayed at an appropriate position other than the position of the display mark 206 on the display screen W.

Thus, according to this embodiment, the check and comparison of detailed behaviors of waveforms of selected pieces of partial time-series data can be easily performed. The date of occurrence of an event and the period between selected pieces of partial time-series data can be easily understood. When a worker performs the check of the date and frequency of occurrence of a predetermined event or the check and comparison of detailed behaviors of extracted pieces of partial time-series data, the worker can perform it without selecting a specific period again. This leads to the easier operation of the worker. When a plurality of pieces of partial time-series data are selected, the check and comparison of detailed behaviors of waveforms can be easily performed using the lower graph and the upper graph which represent the correspondence between these selected pieces of partial time-series data. These graphs also indicate how far apart a plurality of selected waveforms are on a time-series basis. This can help the comparison between pieces of data. This embodiment and this modification may be combined with the above embodiment and the above modification.

Third Embodiment

Next, the case will be described in detail where a single waveform on the lower graph is enlarged, observed, and compared. A description and illustration will be made below of the configurations of hardware and a control system that differ from the above embodiments. In addition, parts similar to those of the above embodiments are regarded as having similar configurations and functions, and the detailed description thereof is omitted.

Figure 13:
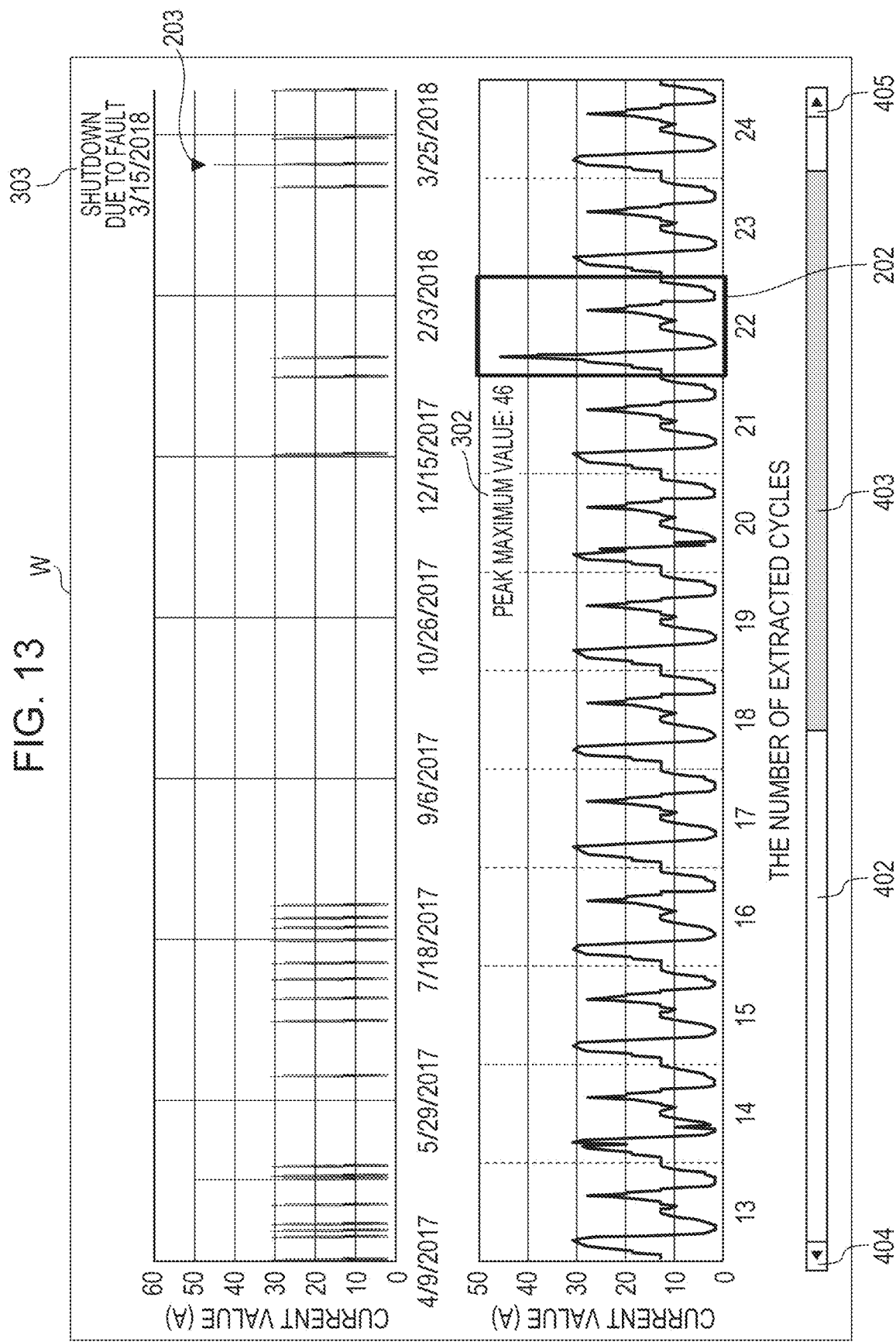
FIG. 13 is a diagram illustrating a display screen according to an embodiment.

FIG. 13 illustrates an example of the display screen W according to this embodiment. The display control of the display screen W is performed by the display mark generation portion 114 and the edit portion 115. When a graph is displayed on the display unit 130 using the coupling data stored in the coupling data storage portion 124 in step S105, the graph is enlarged in the horizontal-axis direction on the lower graph in FIG. 13 for ease of observation or comparison of waveforms. Accordingly, the whole of the coupling data does not fit on the display screen W of the display unit 130 and waveforms in only 12 cycles are displayed in this embodiment (FIG. 13) while the waveforms in 24 cycles can be displayed in the above embodiments (FIGS. 9 to 12).

In this embodiment, a scroll bar 402, a knob 403, arrows 404 and 405 are displayed to allow a worker to scroll the lower graph in a predetermined direction and observe the lower graph. By moving the knob 403 to the right side of a sheet surface or clicking the arrow 405, a waveform in the 25th cycle can be displayed. By moving the knob 403 to the left side of the sheet surface or clicking the arrow 404, a waveform in the 12th cycle can be displayed. With the scroll bar 402, the knob 403, and the arrows 404 and 405, invisible waveforms can be displayed on the lower graph. This leads to the easy observation and comparison of waveforms.

Figure 14:
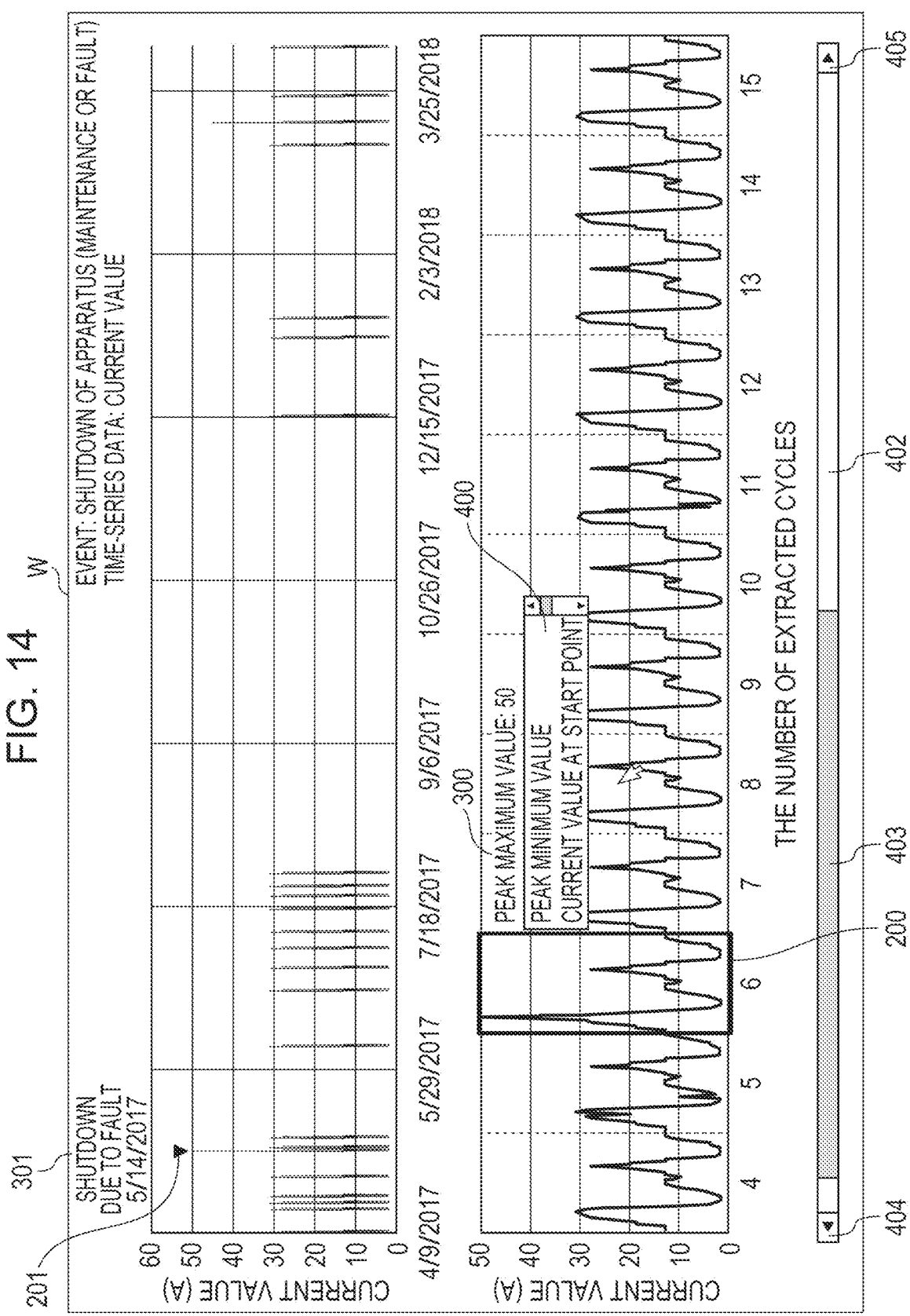
FIG. 14 is a diagram illustrating a display screen according to an embodiment.

By selecting a waveform different from a currently selected waveform on the upper graph, the automatic scroll of the lower graph may be performed. FIG. 14 illustrates the display screen W on which the display state in FIG. 13 has been changed by the automatic scroll of the lower graph.

FIG. 14 illustrates the display screen W after the display state in FIG. 13 has been changed to a state at the time of selection of the waveform in the 6th cycle represented by the display mark 201 on the upper graph. When the waveform in the 6th cycle represented by the display mark 201 is selected, the knob 403 automatically moves and the waveform in the 6th cycle is displayed on the lower graph. Along with this, the display mark 200 is superimposed on the waveform in the 6th cycle on the lower graph. Like in the above embodiments, the information content icons 300 and 302 may represent the minimum peak value of a current value. A graphical user interface may be provided to allow a worker to set the display contents of the information content icons 300 and 302 as appropriate.

Thus, according to this embodiment, the check and comparison of detailed behaviors of waveforms of selected pieces of partial time-series data can be easily performed. Since a scroll bar is used or the lower graph automatically moves in response to the selection of a waveform on the upper graph at the time of, for example, comparison between a plurality of waveforms, a worker can perform the comparison without selecting a specific period again. This leads to an easy operation. This embodiment and this modification may be combined with the above various embodiments and the above various modifications.

A scroll bar used for scrolling the lower graph is displayed in this embodiment, but a scroll bar used for scrolling the upper graph may be displayed.

Fourth Embodiment

Example Case where Time-Series Data Display Apparatus is Connected to Robot

Figure 15:
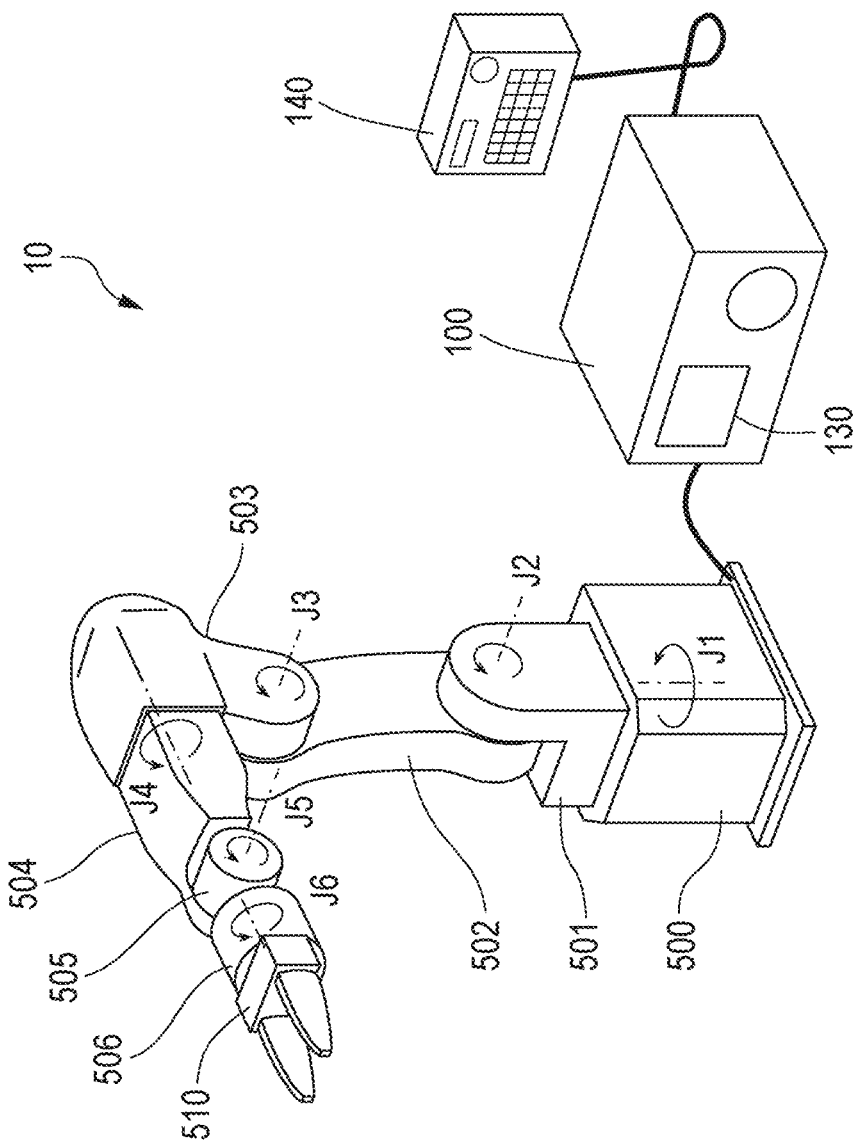
FIG. 15 is a diagram illustrating a robot apparatus according to an embodiment.

FIG. 15 illustrates a case where the time-series data display apparatus 100 according to the above embodiments is connected to a six-axis articulated robot serving as an example of the mechanical apparatus 10.

Links 500, 501, 502, 503, 504, 505, and 506 of a six-axis articulated robot are serially interconnected by six rotary joints J1, J2, J3, J4, J5, and J6. The six-axis articulated robot includes, for example, a sensor for measuring the rotation speed of a motor of each rotary joint, a sensor for measuring the rotation angle of the joint, a torque sensor, a sensor for measuring the current of the motor, and a pressure sensor for measuring the pressure of air for driving an actuator.

For example, a robot hand 510 can be removably attached to a link on the distal end as an actuator.

The time-series data display apparatus 100 according to an embodiment is communicably connected to the six-axis articulated robot. The time-series data display apparatus 100 collects the pieces of time-series data of a physical quantity regarding the state of the robot and event data regarding an event that occurs at the robot.

The six-axis articulated robot repeatedly performs, for example, an operation of assembling components and manufacturing a product. An operator can input an instruction to the time-series data display apparatus 100 via the input unit 140 to cause the time-series data display apparatus 100 to generate, display, and print an image.

For example, when the six-axis articulated robot performs processing for griping a predetermined work and assembling the predetermined work to another work to manufacture a product, an image on which graphs of partial time-series data regarding a predetermined event (e.g., fault) are coupled can be generated and displayed on the display unit 130. Such display allows an operator to easily check the history of the robot regarding the predetermined event and determine whether the robot can continue to manufacture a product. That is, by connecting a time-series data display apparatus according to an embodiment of the present disclosure to a manufacture apparatus such as a robot to cause the time-series data display apparatus to display partial time-series data, the manufacturing of a product can be performed while the occurrence of a shutdown due to a fault is prevented in advance.

FIG. 16 illustrates another example of the display screen W according to an embodiment. In this example, to allow a worker (an operator) to easily visually recognize the boundary between pieces of partial time-series data, pieces of partial time-series data (graphs) are coupled and placed such that adjacent pieces of partial time-series data are spaced at predetermined short intervals (the lower graphs in the above embodiments). An information mark representing information about the contents of an event is added to each graph. In this example, a display mark representing a shutdown in a normal state (e.g., maintenance) and a display mark representing a shutdown in an abnormal state (e.g., fault) are set, associated with respective graphs, and displayed as labels representing sub-classification of a shutdown event. Above each of the labels, a check box (icon) used to select a waveform to be employed as learning data for the generation of a fault prediction model is displayed. The label and the check box may be displayed in response to an instruction from a worker (an operator) input via the input unit 140, or may be automatically displayed by a control program.

Thus, an operator can generate training data (learning data) used for the construction of a post-learning model for the prediction of a fault of a robot using the time-series data display apparatus 100. An operator can select a predetermined event from among pieces of event data acquired by the time-series data display apparatus 100 and cause the time-series data display apparatus 100 to extract partial time-series data from among the pieces of time-series data of various physical quantities and to display an image on which, for example, the comparison between graphs can be easily performed.

Using the check boxes illustrated in FIG. 16, an operator can easily flag data determined to be suitable as a learning material of machine learning and construct training data (learning data). This embodiment and this modification may be combined with the above various embodiments and the above various modifications.

Pieces of partial time-series data of a physical quantity of one type such as "current value" are extracted and arranged along the horizontal axis as graphs on a single screen in the above-described example, but another example may be employed. If graphs of pieces of partial time-series data of physical quantities of a plurality of types can be displayed on the same screen, for example, a worker (an operator) can easily determine the correlation between physical quantities of different types at the event and conveniently use the graphs to extract learning data used for the generation of a fault prediction model. The display screen W illustrated in FIG. 16 may be used in the above various embodiments.

The present invention is not limited to the above embodiments, and many modifications of the above-described embodiments can be made without departing from the spirit, scope, or technical idea of the present invention.

Other Embodiments

For example, the graph of a physical quantity regarding an event of one type does not necessarily have to be displayed in an embodiment of the present disclosure. For example, events of a plurality of types are set as extraction conditions (predetermined conditions) in step S102 in the flowchart in FIG. 3. In step S103, a graph on which extracted pieces of partial time-series data of a physical quantity at each of the predetermined events of a plurality of types are coupled along the horizontal axis is generated. Such graphs can be arranged and displayed on the same screen in step S104. An operator can conveniently use the graphs to determine whether there is a correlation between the events of a plurality of types in the case of the physical quantity.

In the above various embodiments, partial time-series data is extracted on the basis of predetermined conditions, and most of time-series data during a continuous operation is not displayed on the upper graph on the display screen W. However, original time-series data (row waveforms and row data) during a continuous operation may be displayed on condition that the redundancy of the time-series data is reduced to some degree. Also in this case, the check and comparison of detailed behaviors of pieces of partial time-series data can be easily performed using display marks that move in synchronization with each other.

Various embodiments of the present disclosure can also be realized by supplying a program that realizes one or more functions of the embodiments to a system or an apparatus via a network or a storage medium and causing one or more processors in the computer of the system or apparatus to read out and execute the program. Furthermore, some embodiments of the present disclosure can also be realized by a circuit (e.g., application specific integrated circuit (ASIC)) that realizes one or more functions of the embodiments. A control program that can execute an information processing method or a display method according to an embodiment and a computer-readable non-transitory recording medium that stores the control program are included in an embodiment of the present disclosure.

A six-axis articulated robot has been described as an example of the mechanical apparatus 10 in the above embodiments, but the mechanical apparatus 10 does not necessarily have to be a six-axis articulated robot. For example, a machine that can automatically perform extension, stretch, vertical movement, lateral movement, a turning operation, or a combined operation thereof on the basis of information stored in a storage device provided in a control apparatus can be employed as the mechanical apparatus 10.

According to various embodiments of the present disclosure, a worker can easily perform the check and comparison of pieces of partial data optionally selected from among collected pieces of time-series data.

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-078632 filed May 6, 2021, which is hereby incorporated by reference herein in its entirety.

What is claimed is:

1. An information processing method comprising:
    causing an information processing apparatus to display a first image on which a plurality of pieces of partial time-series data of a physical quantity regarding a state of a mechanical apparatus are displayed;
    causing the information processing apparatus to display a second image on which the plurality of pieces of partial time-series data are displayed at intervals different from intervals at which the plurality of pieces of partial time-series data are displayed on the first image;
    the second image is displayed together with the first image, and
    causing the information processing apparatus to display a first mark marking first partial time-series data that is predetermined one of the plurality of pieces of partial time-series data displayed on the first image and a second mark marking second partial time-series data that is one of the plurality of pieces of partial time-series data displayed on the second image and that corresponds to the first partial time-series data.

2. The information processing method according to claim 1, wherein the information processing apparatus displays on the second image the plurality of pieces of partial time-series data at intervals shorter than intervals at which the plurality of pieces of partial time-series data are displayed on the first image.

3. The information processing method according to claim 1, wherein the information processing apparatus displays the first mark and the second mark when the first partial time-series data or the second partial time-series data is selected.

4. The information processing method according to claim 1, wherein the information processing apparatus displays a third mark representing a relationship between the first mark and the second mark.

5. The information processing method according to claim 1, wherein, when the first partial time-series data displayed on the first image is selected in a state where the second partial time-series data corresponding to the first partial time-series data is not displayed on the second image, the information processing apparatus updates the second image such that the second partial time-series data is displayed on the second image.

6. The information processing method according to claim 5, wherein the information processing apparatus displays the second partial time-series data by scrolling the second image in a predetermined direction.

7. The information processing method according to claim 1, wherein, when a plurality of pieces of the first partial time-series data or a plurality of pieces of the second partial time-series data are selected, the information processing apparatus displays a fourth mark representing a time-series relationship between the plurality of pieces of first partial time-series data or the plurality of pieces of second partial time-series data.

8. The information processing method according to claim 7, wherein the information processing apparatus displays a first icon representing the amount of time between the plurality of pieces of first partial time-series data or the plurality of pieces of second partial time-series data.

9. The information processing method according to claim 8, wherein, when the first icon is selected, the information processing apparatus displays a first menu used to set a unit of the amount of time represented by the first icon.

10. The information processing method according to claim 1, wherein the information processing apparatus displays the second mark to surround a first point and a second point of the selected second partial time-series data.

11. The information processing method according to claim 10, wherein the first point is a start point and the second point is an end point.

12. The information processing method according to claim 1, wherein the information processing apparatus displays a second icon representing the physical quantity of the second partial time-series data marked by the second mark.

13. The information processing method according to claim 12, wherein, when the second icon is selected, the information processing apparatus displays a second menu used to set a type of the physical quantity represented by the second icon.

14. The information processing method according to claim 1,
    wherein the partial time-series data is data extracted from among pieces of time-series data based on predetermined conditions, and
    wherein the information processing apparatus displays contents of the predetermined conditions or a date regarding the first partial time-series data or the second partial time-series data that has been selected.

15. The information processing method according to claim 14, wherein the information processing apparatus displays the contents or the date on the first image.

16. The information processing method according to claim 1, wherein the information processing apparatus displays a scroll bar used to scroll the first image or the second image.

17. The information processing method according to claim 1, wherein the information processing apparatus displays a rectangle as the second mark.

18. The information processing method according to claim 1, wherein the information processing apparatus transparently displays the second mark.

19. The information processing method according to claim 1, wherein the information processing apparatus displays an inverted triangle as the first mark.

20. The information processing method according to claim 1, wherein, on the first image, the information processing apparatus arranges and displays the plurality of pieces of partial time-series data on a linear scale for which time is set as an index.

21. The information processing method according to claim 1, wherein the information processing apparatus couples and displays the plurality of pieces of partial time-series data on the second image.

22. The information processing method according to claim 1, wherein the information processing apparatus displays a third icon used to set a normal state or an abnormal state for each of the plurality of pieces of partial time-series data.

23. The information processing method according to claim 22, wherein the third icon is a check box.

24. The information processing method according to claim 1, wherein the partial time-series data is sensor data from a sensor provided in the mechanical apparatus.

25. The information processing method according to claim 1, wherein the partial time-series data on the second image is displayed in an enlarged view as compared with the partial time-series data on the first image.

26. A computer-readable non-transitory recording medium recording a program that a computer executes to perform the information processing method according to claim 1.

27. An information processing apparatus configured to display,
   a first image on which a plurality of pieces of partial time-series data of a physical quantity regarding a state of a mechanical apparatus are displayed,
   a second image on which the plurality of pieces of partial time-series data are displayed at intervals different from intervals at which the plurality of pieces of partial time-series data are displayed on the first image,
   the second image is displayed together with the first image, and
   a first mark marking first partial time-series data that is predetermined one of the plurality of pieces of partial time-series data displayed on the first image and a second mark marking second partial time-series data that is one of the plurality of pieces of partial time-series data displayed on the second image and that corresponds to the first partial time-series data.

28. A product manufacturing method comprising:
   causing the information processing apparatus according to claim 27 to display the first image and the second image;
   controlling the mechanical apparatus based on the first image and the second image; and
   causing the mechanical apparatus to manufacture a product.

29. A method of acquiring learning data comprising causing the information processing apparatus according to claim 27 to acquire learning data used to generate a post-learning model for prediction of a fault of the mechanical apparatus.

* * * * *